(12) United States Patent
Bradley

(10) Patent No.: US 8,635,926 B2
(45) Date of Patent: Jan. 28, 2014

(54) SYSTEM AND METHOD FOR CONTROLLING A TRANSMISSION

(75) Inventor: Jesse B. Bradley, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 173 days.

(21) Appl. No.: 13/303,281

(22) Filed: Nov. 23, 2011

(65) Prior Publication Data

US 2013/0125684 A1    May 23, 2013

(51) Int. Cl.
*F16H 59/00*    (2006.01)

(52) U.S. Cl.
USPC .......................................................... 74/335

(58) Field of Classification Search
USPC .................................... 74/330, 331, 333, 335
See application file for complete search history.

(56) References Cited

U.S. PATENT DOCUMENTS

| | | | |
|---|---|---|---|
| 2007/0199397 A1* | 8/2007 | Maten et al. | 74/340 |
| 2008/0153666 A1* | 6/2008 | Fahland et al. | 477/107 |
| 2008/0236317 A1* | 10/2008 | Matsushita et al. | 74/340 |
| 2011/0035121 A1* | 2/2011 | Katrak et al. | 701/51 |

* cited by examiner

*Primary Examiner* — Ha D Ho

(57) ABSTRACT

The present invention provides a system for controlling a vehicle comprising a prime mover, a first sensor, a transmission, a second sensor, and a transmission controller. The first sensor outputs a first signal that indicates a speed of an input shaft of the transmission and the second sensor outputs a second signal that indicates a speed of the prime mover. The transmission controller includes control logics that control the transmission using the first signal, perform a diagnostic check on the first sensor, determining whether the diagnostic check of the second control logic indicates that the first sensor meets a predefined performance characteristic, instruct the transmission controller to use the second signal of the second sensor to control the transmission if the third control logic indicates that the first sensor does not meet the predefined performance characteristic, and control the transmission using the second signal of the second sensor.

10 Claims, 2 Drawing Sheets

SYSTEM AND METHOD FOR CONTROLLING A TRANSMISSION

FIELD

The present disclosure relates to methods and systems for controlling a transmission, and more particularly to methods and systems for controlling a transmission after detecting a faulty sensor.

BACKGROUND

The statements in this section merely provide background information related to the present disclosure and may or may not constitute prior art.

Automatic transmissions often employ sensors to detect a shaft input speed to the transmission. The input speed may be used in various ways to improve the quality and performance of transmission shifts between speed ratios of the transmission. Occasionally, the sensor for the transmission input speed may output a faulty or noisy signal. Such faulty or noisy signals are often inadequate for use in controlling the transmission as desired. A transmission with a faulty sensor may exhibit decreased drivability or may be placed into a "limp-home" mode having reduced transmission performance. Accordingly, there is a need in the art to provide a method and system for improving transmission performance when a transmission speed input sensor fails.

SUMMARY

The present invention provides a system for controlling a vehicle comprising a prime mover, a first sensor, a transmission, a second sensor, and a transmission controller. The prime mover includes an output shaft and the second sensor is configured to detect a rotational speed of the output shaft of the prime mover and output a second signal indicative of the speed of the output shaft of the prime mover. The transmission has an input shaft, a clutch assembly, a plurality of gears, a plurality of torque transmitting devices, and an output shaft. The clutch assembly includes a friction clutch that rotationally couples the input shaft with the plurality of gears and the plurality of torque transmitting devices are selectively engageable with the plurality of gears to establish a plurality of speed ratios between the input shaft and the output shaft. The first sensor is configured to detect a rotational speed of the input shaft of the transmission and output a first signal indicative of the speed of the input shaft of the transmission. The transmission controller is in electronic communication with the first and second sensors and is operable to control the transmission by selectively engaging the plurality of torque transmitting devices, wherein the transmission controller includes a first, second, third, fourth, and fifth control logic. The first control logic is for controlling the transmission using the first signal of the first sensor, the second control logic is for performing a diagnostic check on the first sensor, the third control logic is for determining whether the diagnostic check of the second control logic indicates that the first sensor meets a predefined performance characteristic, the fourth control logic is for instructing the transmission controller to use the second signal of the second sensor to control the transmission if the third control logic indicates that the first sensor does not meet the predefined performance characteristic, and the fifth control logic is for controlling the transmission using the second signal of the second sensor.

In another aspect of the present invention, the clutch assembly is a friction launch clutch assembly.

In yet another aspect of the present invention, the first and fifth control logics include instructions for controlling the transmission by commanding the timing and force of engagement of the plurality of torque transmitting devices.

In yet another aspect of the present invention, the control logic further comprises a sixth control logic for returning the transmission controller to the first control logic if the diagnostic check of the third control logic indicates that the first sensor meets the predefined performance characteristic.

In yet another aspect of the present invention, the predefined performance characteristic of the first sensor is a first signal with less than a predefined amount of signal noise.

In yet another aspect of the present invention, the system further includes a flywheel and the input shaft of the transmission is directly rotationally coupled with the flywheel.

In yet another aspect of the present invention, the clutch assembly is a dual clutch assembly including a first friction clutch and a second friction clutch.

In yet another aspect of the present invention, the transmission is a dual clutch transmission, the plurality of gears are co-planar gear sets, and the plurality of torque transmitting devices are synchronizers.

In yet another aspect of the present invention, the synchronizers are selectively engageable to provide at least seven forward speed ratios and at least one reverse speed ratio.

In yet another aspect of the present invention, the prime mover is an internal combustion engine.

In yet another aspect of the present invention, a method for controlling a transmission of a motor vehicle is provided. The method includes the steps of: receiving a first signal from a first sensor that is configured to output the first signal to indicate a rotational speed of an input shaft of the transmission; processing the first signal with a transmission controller; commanding a plurality of torque transmitting devices using the first signal to establish a plurality of speed ratios between the input shaft and an output shaft of the transmission; performing a diagnostic check on the first sensor; determining whether the diagnostic check indicates that the first sensor meets a predefined performance characteristic; instructing the transmission controller to use a second signal of a second sensor to control the transmission if the diagnostic check indicates that the first sensor does not meet the predefined performance characteristic, wherein the second sensor is configured to output the second signal that indicates a speed of a prime mover interconnected with the transmission input shaft; and commanding the plurality of torque transmitting devices using the second signal when the diagnostic check indicates that the first sensor does not meet the predefined performance characteristic.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

FIG. 1 a schematic view of an exemplary system according to the principles of the present invention;

DETAILED DESCRIPTION

Figure 1:
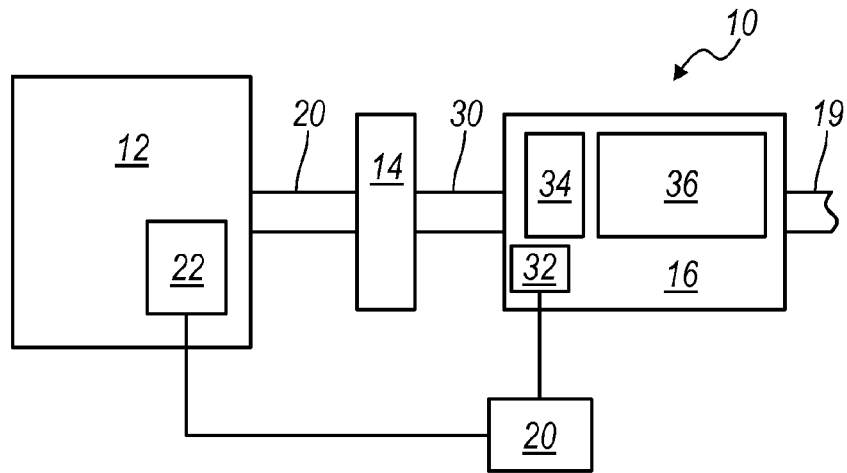
Figure 2:
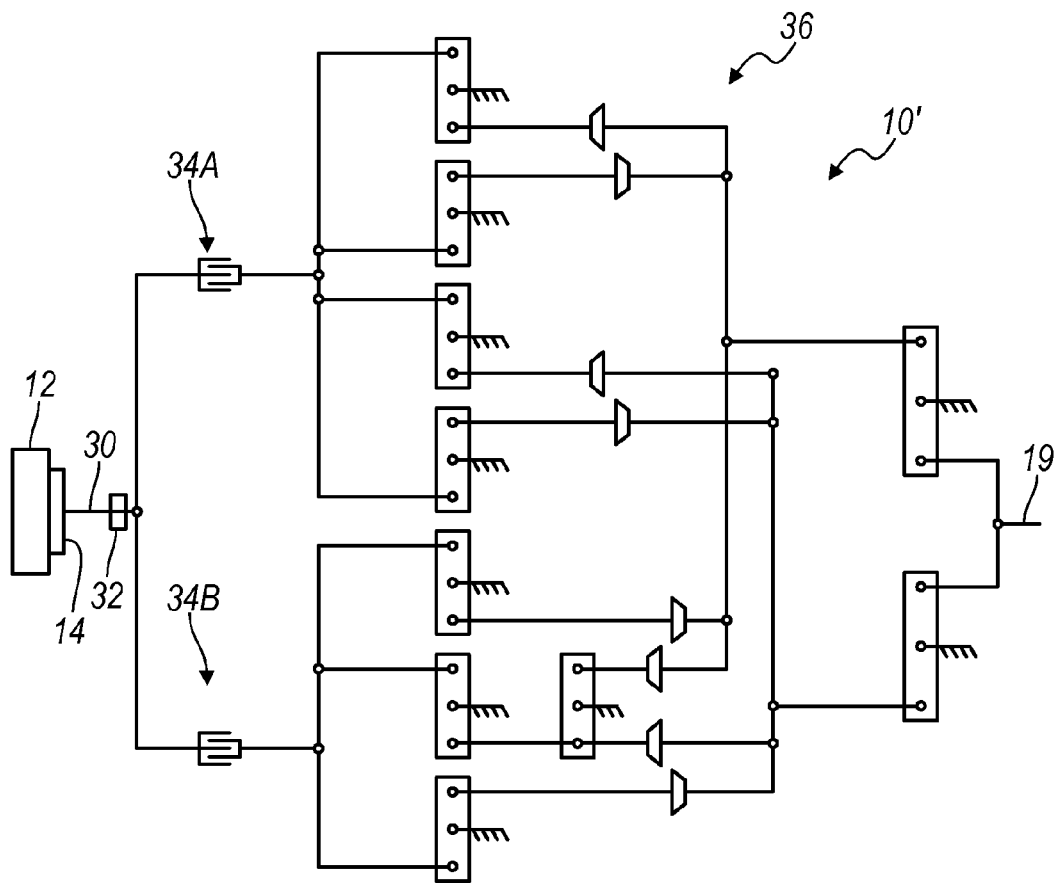
FIG. 2 is a lever diagram of an exemplary transmission according to the principles of the present invention.

Referring to the drawings, wherein like reference numbers refer to like components, in FIG. 1 a system 10 for controlling a transmission of a vehicle is schematically illustrated and in FIG. 2 a lever diagram of an exemplary transmission 10' for use with the system is illustrated. In the embodiment provided, system 10 includes a prime mover 12, a flywheel or vibration absorber 14, transmission 16, and a transmission controller 20 with control logic embodied in hardware, software, or a combination of hardware and software within controller 20. In the example provided, the prime mover 12 is an internal combustion engine. It should be appreciated that other prime movers, such as electric motors, may be incorporated without departing from the scope of the present invention. The engine 12 has an engine output shaft 20 and an engine speed sensor 22. The engine output shaft 20 is rotatably coupled with the crankshaft of the engine 12. The engine speed sensor 22 outputs a signal that indicates the rotational speed of the engine 12 and the engine output shaft 20. The example provided incorporates an engine speed sensor 22 that outputs a signal that indicates when a ferrous gear tooth of a gear that is coupled to the engine passes a magnetic sensor. It should be appreciated that the engine speed sensor 22 may alternatively measure speed using other technologies, such as mechanically or optically, without departing from the scope of the present invention.

The flywheel 14 reduces torsional vibrations between the engine output shaft 20 and the transmission 16. The flywheel may incorporate springs, weights, pendulums, and other technologies without departing from the scope of the present invention.

The transmission 16 is an automatic transmission that provides multiple speed ratios between a transmission input shaft 30 and a transmission output shaft 19. The example provided is a dual clutch or automated manual transmission 16. The transmission 16 may be other types of transmissions without departing from the scope of the present invention. The transmission 16 includes the transmission input shaft 30, a transmission input speed sensor 32, a clutch assembly 34, and a plurality of gears 36 for establishing the multiple speed ratios. The transmission input shaft 30 is rotationally coupled with the flywheel 14 and the clutch assembly 34. The transmission input speed sensor 32 is similar to the engine speed sensor 22, however, the transmission input speed sensor 32 is configured to output a signal that indicates the speed of the transmission input shaft 30.

The clutch assembly 34 includes at least one launch or friction clutch that rotationally connects the transmission input shaft 30 with the plurality of gears 36 without a substantial difference between the speed of the engine 12 and the speed at the clutch assembly 34. Therefore, the clutch assembly 34 is any clutch assembly that does not incorporate a fluid coupling or torque converter. The launch clutch assembly 34 provided is a dual clutch assembly having a first clutch 34A and a second clutch 34B. It should be appreciated that a single friction launch clutch may be incorporated without departing from the scope of the present invention.

The plurality of gears 36 are selectively engageable by a plurality torque transmitting devices (not shown) for selectively transferring power between the plurality of gears and ultimately to the transmission output shaft 19. The example provided is a dual clutch transmission 16 having meshing co-planar gear sets and synchronizers. It should be appreciated that other gear configurations, such as with planetary gear sets, may be incorporated when the clutch assembly 34 is used.

The transmission controller 20 generally includes a processor (not shown) in communication with electronic memory storage devices (not shown). Further, control logic is also provided in the controller 20 and may be implemented in hardware, software, or a combination of hardware and software. For example, a control logic may be in the form of program code that is stored on the electronic memory storage and executable by the processor. The transmission controller 30 is in electronic communication with both the engine speed sensor 22 and the transmission input sensor 32. In the embodiment provided, the transmission input sensor 32 is in direct electronic communication with the controller 30 and the engine speed sensor 22 is in electronic communication with an engine controller (not shown), which broadcasts the engine speed sensor 22 signal to the transmission controller 30. Under default conditions, the controller 20 receives the signal from the transmission input and selectively activates a plurality of control devices, such as the torque transmitting devices, to control the operation of the transmission.

For example, a control logic implemented in software program code that is executable by the processor of controller 20 includes a first control logic for controlling the transmission with the signal from the transmission input speed sensor 32, a second control logic for performing diagnostic checks on the transmission input speed sensor 32, a third control logic for determining whether the transmission input speed sensor 32 is faulty, a fourth control logic for instructing the controller 20 to use the engine speed sensor 22 to control the transmission 16, and a fifth control logic for operating the transmission 16 using the engine speed sensor 22.

Figure 3:
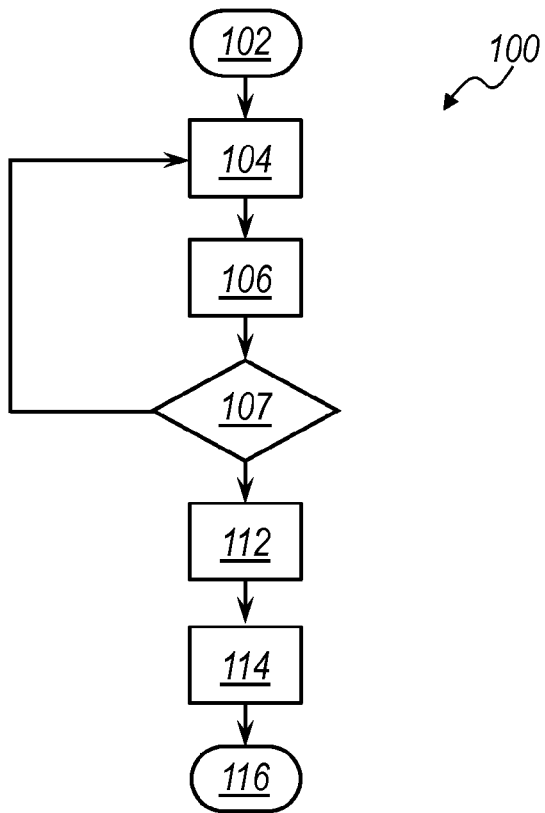
FIG. 3 is a flowchart of a method of controlling a transmission according to the principles of the present invention.

Referring now to FIG. 3, a flowchart of a method 100 for controlling the transmission 16 is shown, in accordance with an embodiment of the present invention. The method 100 is initiated at block 102. At block 104 the method 100 controls operation of the transmission 16 using the transmission input speed sensor 32. For example, the timing of and force of actuation of the torque transmitting mechanisms (not shown) are determined at least in part by the signal from the transmission input speed sensor 32.

Figure 4:
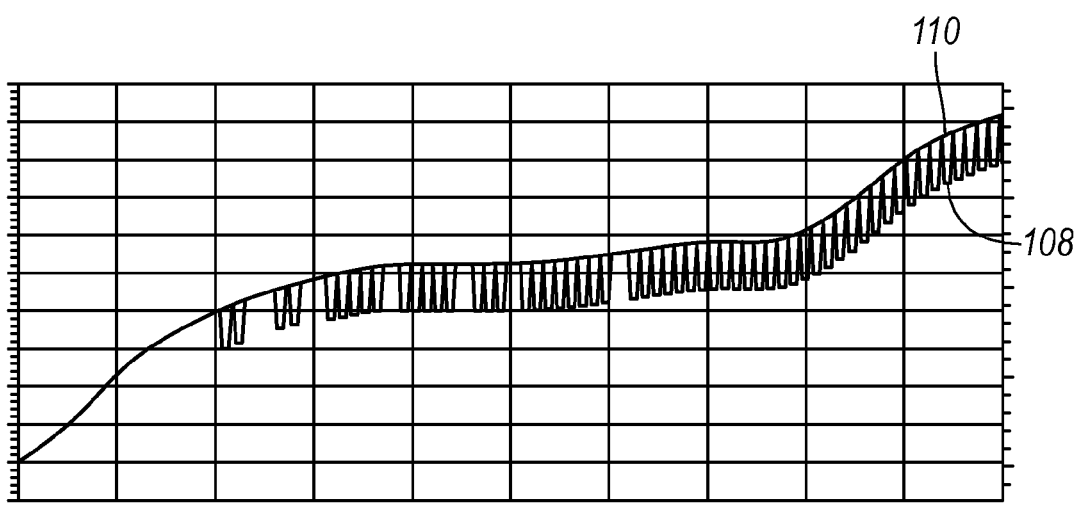
FIG. 4 is a graph illustrating signals from speed sensors according to the principles of the present invention.

In step 106 the controller 20 performs diagnostic tests on the input speed sensor 32. In step 107 the controller 20 determines whether the transmission speed input sensor 32 signal is faulty. For example, FIG. 4 illustrates an exemplary first signal 108 from a faulty transmission input speed sensor and an exemplary second signal 110 from the engine speed sensor 22. In the example provided, the first signal 108 is noisy and may be inaccurate or difficult to read. The second signal 110 is not noisy and is indicative of the speed of the transmission input shaft 30. If the controller 20 determines that the first signal 108 does not indicate a faulty sensor 32 then the method returns to step 104 and the signal 108 from the sensor 32 is used to control the transmission 16.

If the controller 20 determines that the first signal 108 is faulty, the method proceeds to step 112. In step 112 the controller 20 is instructed to use the second signal 110 from the engine speed sensor 22 to control the transmission 16. In step 114 the method controls the transmission 16 using the second signal 110 from the engine speed sensor 22 as a replacement for the faulty first signal 108 from the transmission input speed sensor 32. For example, the timing of and force of actuation of the torque transmitting mechanisms (not shown) are now determined at least in part by the signal from the engine speed sensor 22. The method ends at block 116.

The present invention provides beneficial operation of the transmission when a faulty transmission input speed sensor is detected. Accordingly, shift quality and transmission performance are substantially maintained until the transmission input speed sensor is replaced.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

I claim:

1. A system for controlling a vehicle, the system comprising:
   a prime mover including an output shaft;
   a transmission having an input shaft, a clutch assembly, a plurality of gears, a plurality of torque transmitting devices, and an output shaft, wherein the clutch assembly includes a friction clutch that rotationally couples the input shaft with the plurality of gears, and wherein the plurality of torque transmitting devices are selectively engageable with the plurality of gears to establish a plurality of speed ratios between the input shaft and the output shaft;
   a first sensor configured to detect a rotational speed of the input shaft of the transmission and output a first signal indicative of the speed of the input shaft of the transmission;
   a second sensor configured to detect a rotational speed of the output shaft of the prime mover and output a second signal indicative of the speed of the output shaft of the prime mover;
   a transmission controller in electronic communication with the first and second sensors and operable to control the transmission by selectively engaging the plurality of torque transmitting devices, wherein the transmission controller includes control logic comprising:
      a first control logic for controlling the transmission using the first signal of the first sensor;
      a second control logic for performing a diagnostic check on the first sensor;
      a third control logic for determining whether the diagnostic check of the second control logic indicates that the first sensor meets a predefined performance characteristic;
      a fourth control logic for instructing the transmission controller to use the second signal of the second sensor to control the transmission if the third control logic indicates that the first sensor does not meet the predefined performance characteristic; and
      a fifth control logic for controlling the transmission using the second signal of the second sensor.

2. The system of claim 1 wherein the clutch assembly is a friction launch clutch assembly.

3. The system of claim 1 wherein the first and fifth control logics include instructions for controlling the transmission by commanding the timing and force of engagement of the plurality of torque transmitting devices.

4. The system of claim 1 wherein the control logic further comprises a sixth control logic for returning the transmission controller to the first control logic if the diagnostic check of the third control logic indicates that the first sensor meets the predefined performance characteristic.

5. The system of claim 1 wherein the predefined performance characteristic of the first sensor is a first signal with less than a predefined amount of signal noise.

6. The system of claim 1 further including a flywheel, and wherein the input shaft of the transmission is directly rotationally coupled with the flywheel.

7. The system of claim 1 wherein the clutch assembly is a dual clutch assembly including a first friction clutch and a second friction clutch.

8. The system of claim 7 wherein the transmission is a dual clutch transmission, the plurality of gears are co-planar gear sets, and the plurality of torque transmitting devices are synchronizers.

9. The system of claim 1 wherein the synchronizers are selectively engageable to provide at least five forward speed ratios and at least one reverse speed ratio.

10. The system of claim 1 wherein the prime mover is an internal combustion engine.

* * * * *